(12) United States Patent
Tillotson

(10) Patent No.: US 7,938,364 B2
(45) Date of Patent: May 10, 2011

(54) APPARATUS AND METHOD FOR MAKING OPTIMAL USE OF A PHOTOVOLTAIC ARRAY ON AN AIRBORNE POWER SYSTEM

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 12/251,331

(22) Filed: Oct. 14, 2008

(65) Prior Publication Data

US 2009/0230237 A1   Sep. 17, 2009

Related U.S. Application Data

(63) Continuation-in-part of application No. 12/128,561, filed on May 28, 2008, which is a continuation-in-part of application No. 12/049,234, filed on Mar. 14, 2008.

(51) Int. Cl.
 *B64B 1/00*   (2006.01)
(52) U.S. Cl. .......... 244/127; 244/30; 244/96; 244/172.7
(58) Field of Classification Search ................ 244/1 TD, 244/158.2, 158.3, 172.7, 172.8, 24, 30, 31, 244/32, 33, 58, 59, 60, 96, 126, 127; 446/33, 446/225; 136/292; 320/DIG. 33
See application file for complete search history.

(56) References Cited

U.S. PATENT DOCUMENTS

| | | | | | |
|---|---|---|---|---|---|
| 4,361,295 | A | * | 11/1982 | Wenzel | 244/33 |
| 4,364,532 | A | * | 12/1982 | Stark | 244/30 |
| 4,581,897 | A | | 4/1986 | Sankrithi | 60/641.12 |
| 5,645,248 | A | | 7/1997 | Campbell | 244/30 |
| 6,581,883 | B2 | * | 6/2003 | McGee et al. | 244/172.6 |
| 7,068,991 | B2 | | 6/2006 | Parise | 455/343.1 |

OTHER PUBLICATIONS

Reuters, "Solar Balloons to Power Remote Areas?", www.msnbc.msn.com/id/24012079/, Apr. 8, 2008.
Agiletti et al., "Solar Power Generation Using High Altitude Platforms Feasibility and Viability", School of Engineering Sciences, University of Southampton.
Official Action, U.S. Appl. No. 12/128,561 dated Feb. 24, 2011 (13 pages).

* cited by examiner

*Primary Examiner* — Tien Dinh
*Assistant Examiner* — Richard R Green
(74) *Attorney, Agent, or Firm* — Hayes Soloway P.C.

(57) ABSTRACT

A system for generating power from sunlight collected substantially above the earth's surface comprises an airborne platform which supports solar power generation system to collect sunlight, convert the sunlight to electricity, and to transmit the electricity to a selected location on the earth's surface. The solar power generation system is coupled to the airborne platform by a support which can be manipulated by a control system to move the solar power generation system away from a shadow that might be cast by the airborne platform.

17 Claims, 17 Drawing Sheets

APPARATUS AND METHOD FOR MAKING OPTIMAL USE OF A PHOTOVOLTAIC ARRAY ON AN AIRBORNE POWER SYSTEM

CROSS REFERENCE TO RELATED APPLICATIONS

The present application is a continuation-in-part of U.S. application Ser. No. 12/128,561 filed May 28, 2008, which in turn is a continuation-in-part of U.S. application Ser. No. 12/049,234, filed Mar. 14, 2008, the contents of which are incorporated herein by reference.

FIELD

The present disclosure is generally related to an apparatus and method for conversion of solar energy to electricity, more particularly, is related to the deployment of solar cell arrays for maximum utilization.

BACKGROUND

There is currently a large domestic and international market for clean non-polluting generated grid and remote electrical power, such as the electrical power generated by solar energy generating systems. This demand is anticipated only to grow.

Terrestrial solar power systems typically are formed of flat panel photovoltaic (PV) cells, concentrator PV cell systems, or concentrator turbogenerators. Flat panel PV cell systems are advantageous in that they convert either direct or diffuse sunlight to electricity, though direct sunlight is preferred. The panels usually are stationary and the systems can become very large in order to generate sufficient amounts of electricity. Concentrator PV cell systems require fewer PV cells but can only convert direct sunlight to electricity, and therefore require a tracking system and clear skies. Concentrator turbogenerators use concentrated solar energy to heat a medium that is sent through a turbine to generate electricity.

One drawback in the implementation of each of these systems commercially is the expense associated with producing PV cells, tracking systems, and land costs. Moreover, solar power is not economically viable in cloudy regions such as the Northwestern United States or Northern Europe. Though solar power technically is feasible in these regions, the long intervals of low illumination a) drive a requirement for very large energy storage systems to provide power throughout the dark intervals, b) reduce the annual energy output per square meter of solar collection area, and c) do not allow use of concentrator PV cells during the frequent intervals of thin overcast. Thus, in regions of low illumination, solar power is effectively eliminated as a potential clean energy source.

Another market in which solar power is not currently economically feasible is in providing power for military forces, disaster relief, or other mobile applications that require infrastructure. Military forces typically consume large amounts of power, and they often use this power in locations where normal infrastructure either does not exist or is threatened by enemy forces. For example, the Department of Defense (DOD) recently estimated that the actual cost for a gallon of fuel for the US Army in some parts of Iraq is $700 due to the cost of convoy security for tanker trucks or the cost of helicopter airlift of petroleum to remote locations.

Typical terrestrial power systems, such as dams, coal-fired generators, and terrestrial solar arrays, are immobile. These are unsuitable for use by military forces or emergency response agencies. Mobile terrestrial power systems typically rely on fossil fuels, e.g. diesel generators. Though mobile forces often use them, these power systems increase mobile forces' dependence on a steady supply of fuel, which comes at a great expense.

One suggested prior art solution for regions of low illumination is to use very large solar arrays and large energy storage systems. The large arrays produce excess power while the sun shines. This power charges the storage system. When sunlight is not available, the energy storage system is discharged to meet the need for power. Unfortunately, this solution is economically prohibitive as the internal rate of return on the large capital investment is too low for investors. The use of large energy storage adds to the cost of an already expensive system. As a result, this solution is not currently in use.

For the reasons discussed above, most cloudy regions in the world today have no plans to use solar power to meet their energy needs. However, most other energy options fail to meet increasing consumer (or regulatory) demand for environmental stewardship. Nuclear energy remains costly and, in many nations, politically sensitive. Most viable hydroelectric sites are already in use; furthermore, the environmental cost of hydroelectric power is increasingly recognized, resulting in some dams being torn down. Wind energy is economically and politically viable in some areas, but is not sufficiently available in many regions. Fossil fuels like petroleum or coal are becoming more costly and are implicated in global warming; petroleum is also subject to political embargoes or to attacks on oil fields, pipelines, ports, refineries, roads, or tanker ships (cf., the military costs for fuel in Iraq today.)

Referring to FIG. 1, in my aforesaid parent application Ser. No. 12/049,234, I describe an airborne power station comprising an airborne platform or aerostat 50 having a solar power generation system 10 and an electric cable 30 to transport power to a control station 20 on the ground. The airborne platform supports the solar power generation system above the clouds 80 and other atmospheric attenuation. The control station receives the power generated at the airborne power station and distributes the power to, for example, local infrastructure 90.

The airborne platform may be an airship, including a blimp, a semi-rigid airship, or a rigid airship. As shown in FIG. 1, the airship 50 may have aerodynamic stabilizers 55 at the tail. The airborne platform preferably will include controls for the platform's yaw (steering), pitch, and/or roll. Airship embodiments may further include aerodynamic surfaces designed to produce lift when the wind blows.

The solar power generation system may be one or more photovoltaic (PV) cell arrays, optical rectennas, and/or electric generators driven by a solar-heated thermodynamic engine. FIG. 1 shows a PV cell array 10, which may be a flat panel cell PV array or a concentrator cell array, which is supported below the airship by structural elements 40. Preferably structural elements 40 are sufficiently rigid so as to permit pointing of the solar arrays independent of the airborne platform. In alternative embodiments, particularly for use at high altitudes, the solar power general system may be suspended below the airship at a distance, e.g., by cables, where it is less likely to be shaded by the airship. In yet other alternative embodiments, the solar power generation system includes elements that can be steered, e.g. to point more directly toward the sun, in order to maximize the amount of direct sunlight, and consequently, the output of electrical energy. The solar power generation system also includes power conversion equipment that converts power from the form produced by the power generation system to a form better suited for transmission along the power cable. For example, it may convert the low-voltage DC output of a photovoltaic array to high-voltage three-phase power.

The power cables could also function as tethers. Alternatively, one or more tethers may be provided. The system may further include one or more mooring devices to which the power lines/tethers are attached.

Alternatively, as shown in FIG. 2, and as described in my aforesaid U.S. patent application Ser. No. 12/128,561, the power generated by power generation system 10 may be converted by a converter 130 to microwave energy, and beamed to a remote collector 120, e.g. located on the Earth.

Airborne power stations such as described in my aforesaid parent applications provide an alternative to previous energy solutions. Nevertheless, there are challenges related to the implementation of an airborne power station system. For example, the photovoltaic array may not always face the sun at a perpendicular angle reducing power due to cosine loss. Furthermore, the airborne platform may shade at least part of the solar power generation system due to at least some combination of wind direction and solar position in the sky, and the solar power generation systems may shade each other due to at least some combination of wind direction and solar position in the sky.

Referring to FIG. 3(A) these problems may be addressed, in part, by providing a large vertical separation from the airborne platform 700 to a solar power generation system 710 hanging the solar power generation system below the airborne platform, which minimizes the time during which the PV array is shaded. Alternatively, the solar power generation system 720 may be deployed horizontally from the airborne platform 700 on a frame extending from the airborne platform as shown in FIG. 3(B). This latter approach works well when the sun is directly overhead. In yet another solution, the solar power generation system 730 may be mounted on the upper surface of the airborne platform 700 so the airborne platform cannot shade the solar arrays, except from the side, as shown in FIG. 3(C). This latter arrangement often uses conformal (flexible) PV arrays. This latter configuration works well when the sun is high in the sky.

Each of these solutions is not without problems. Large vertical separation from the airborne platform to the solar power generation system does not avoid shading when the sun is directly overhead. To minimize the time of shading, the vertical separation may need to be so large that (a) structural weight of the attachment becomes prohibitive, or (b) extra altitude is needed to lift the solar power generation system above a cloud deck. These problems are worse with larger airborne platforms (as needed for high altitude or high power APS) because larger airborne platforms cast a wider shadow. Solar power generation systems extending horizontally from the airborne platform or from a frame hung below it add mass, and are inefficient when the sun is not near its zenith. The arrays on one side are shaded by the airborne platform when the sun is low on one side, and the arrays shade others on the same side when the sun is low in front or back.

Furthermore, PV arrays mounted on the upper surface of the airborne platform suffer from cosine losses, especially when the sun is low in the sky.

SUMMARY

The present disclosure provides a system and method holding the solar power generation system at a lateral offset from the center of the airborne platform, and which pivots the system to position the array on whichever side of the airborne platform is better exposed to the sun to avoid having the APS airship cast its shadow on the photovoltaic array at various times as the sun crosses the sky.

In one embodiment, a system and method for converting sunlight to electricity is provided comprising an airborne platform deploying the solar power generation system above the surface of the earth, a solar power generation system coupled to the airborne platform by a support and a control system coupled to the support to manipulate the support such that the solar power generation system is moved away from the shadow of the airborne platform and to face the sun no matter where it is positioned in the sky.

More particularly, the present disclosure in one embodiment provides a PV array attached to a beam or truss, which is attached to a axle or pivot on the bottom of an airborne platform or airship. The PV array is able to pivot about the beam or truss typically under the control of a motor or other actuator. The beam pivots about the axle, also typically under the control of a motor or other actuator. Together, these two axes enable the PV array to pivot in azimuth and elevation so that the PV array continually faces essentially directly toward the sun. In a preferred embodiment, two arrays are provided, each attached to a support or supports that enable the PV array to pivot in azimuth and elevation.

The present disclosure also provides a method of preventing a solar power generation system of the type described above carried on an airborne platform, and having a tether coupling the airborne platform to the ground, from contacting the tether by monitoring the position of the beam or truss, determining when the beam or truss is close to one side of the tether, and engaging the control system to hold the beam or truss away from the tether.

Other systems, methods, features, and advantages of the present disclosure will be or become apparent upon examination of the following drawings and detailed description. The features, functions and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, wherein:

Referring now to FIGS. 4-5, the present disclosure provides an arrangement for airborne solar power generation systems that includes a solar power generation system 810, such as a PV array, attached to a substantially horizontal beam, or truss 800, which in turn is attached to a substantially vertical axle or pivot 820 supported below the bottom of an airborne platform 50 or airship. The solar power generation system 810 is constructed to pivot about the beam 800, typically under the control of a motor or other actuator. The beam 800 pivots about the vertical axle 820, also typically under the control of a motor or other actuator. Together, these two axes enable the solar power generation system 810 to pivot in azimuth and elevation so that the solar power generation system 810 can be continually aimed to face substantially directly toward the sun.

Preferably, the length of the horizontal beam 800 from the vertical axle 820 to the solar power generation system 810 is sufficient that when (a) the sun is substantially directly over the airborne platform 50, and (b) the beam 800 is oriented substantially perpendicular to the airborne platform 50's length, then (c) the solar power generation system 810 will not be shaded by the airborne platform 50 body. This means the radius $R_{in}$ from the vertical axis to the inner edge of the solar power generation system 810 will be greater than the airborne platform's 50 radius, $R_{aero}$, at the airborne platform's 50 waist. The radial margin by which $R_{in}$ exceeds $R_{aero}$ is a design parameter chosen by the implementor. This margin should be at least large enough to ensure that the entire face of the sun (roughly half a degree wide) can illuminate essentially every point on the solar power generation system 810 when the sun is at the zenith and the solar power generation system 810 oriented to face the sun.

Figure 6:
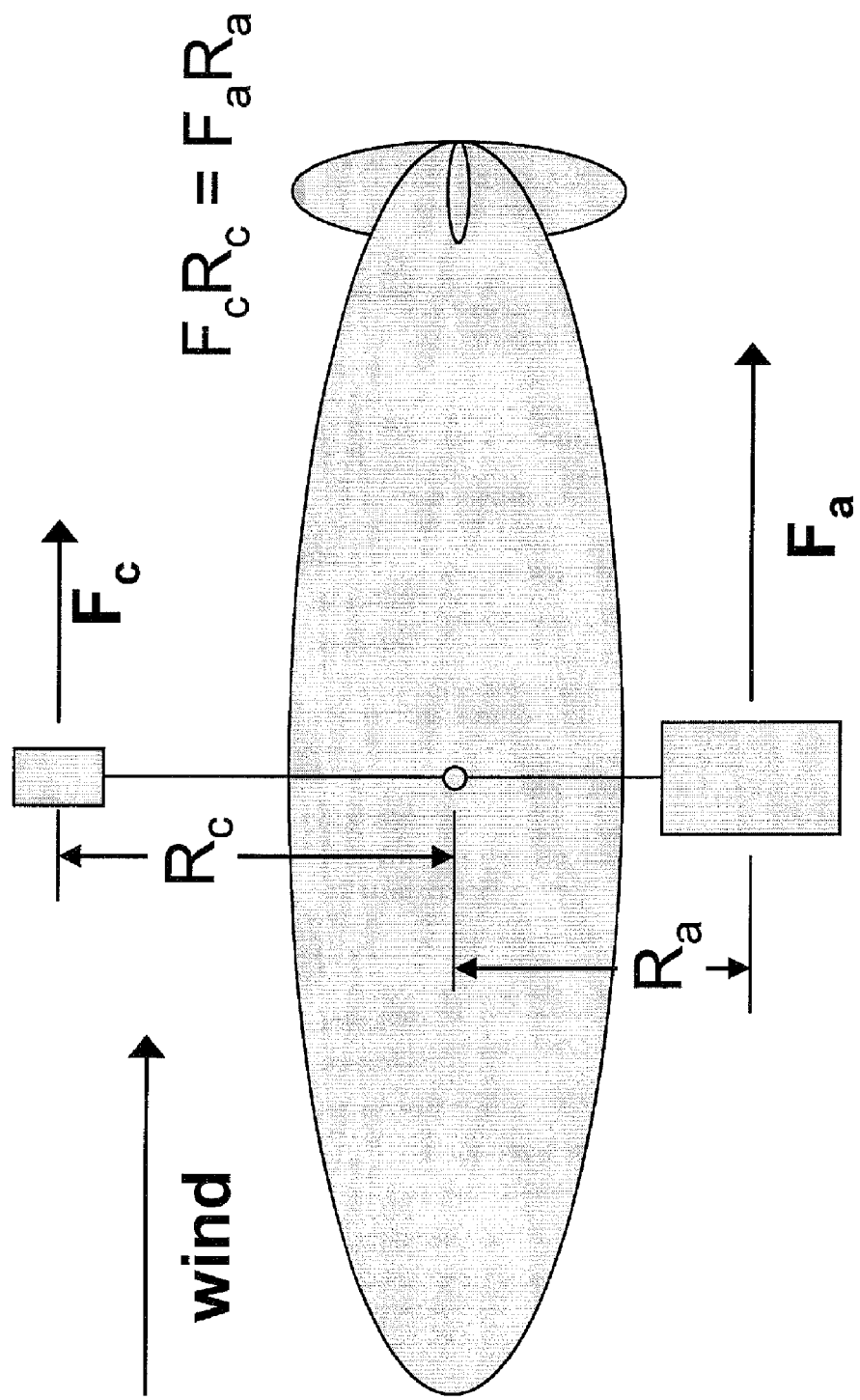
FIG. 6 is a view similar to FIG. 5, showing drag force vectors on the airborne power station of FIG. 4.

The end of the beam 800 opposite from the solar power generation system 810 includes a counterbalance and counterdrag device 830. This device balances the weight of the solar power generation system 810 so neither end of the beam 800 will be pulled toward the Earth. In addition, this device 830 produces aerodynamic lift and drag, which balances the lift and drag of the solar power generation system 810 so the beam 800 incurs essentially no net torque about the pivot point. In the interest of minimizing total system weight and cost, the length of the beam 800 from the pivot 820 to the counterbalance 830 may be made longer than the length from the pivot 820 to the solar power generation system 810. This greater length constitutes a moment arm that allows the counterbalance 830 to weigh substantially less than the solar power generation system 810 and produce substantially less drag than the solar power generation system 810, and yet balance the torque produced by the solar power generation system 810. FIG. 6 illustrates the moment arm and drag force at each end of the beam 800. The torques produced by these forces balance each other, as indicated by the torque equation $F_c R_c = F_a R_a$.

Figure 7:
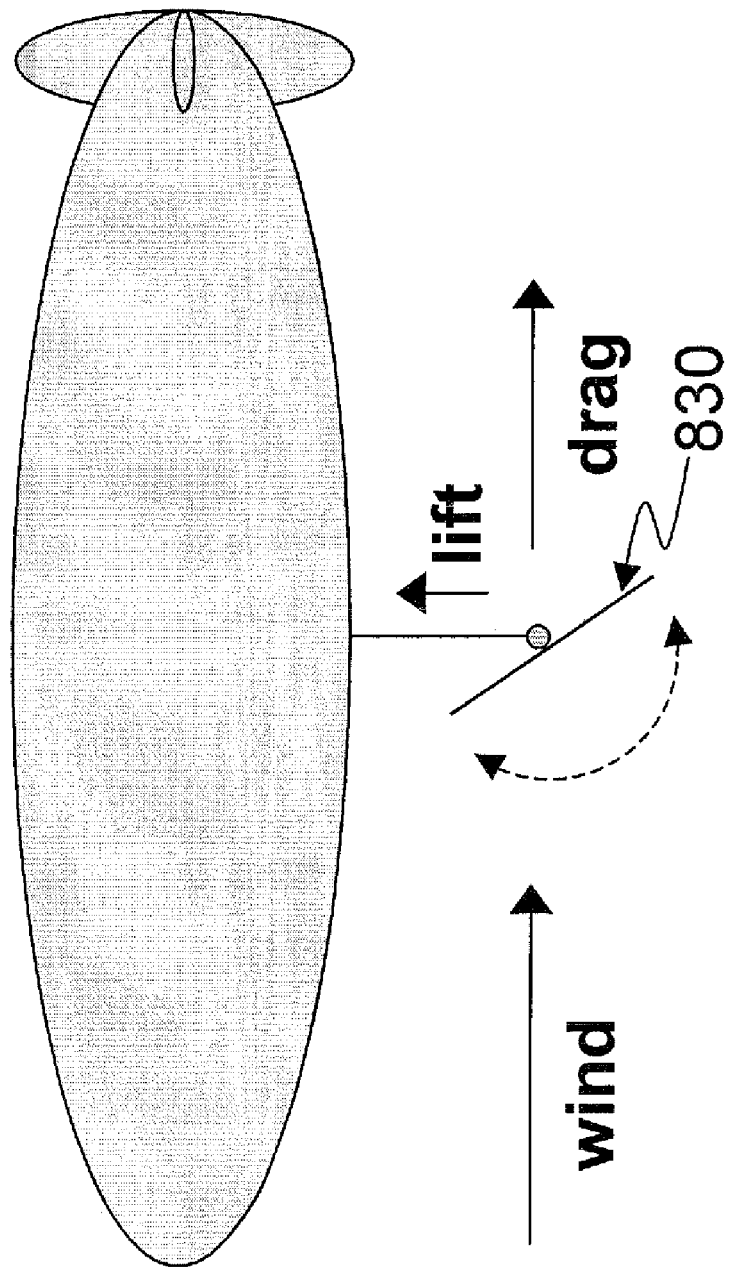
FIG. 7 is a side view of an airborne power station according to FIG. 4, showing left and drag force vectors on the airborne power station.
Figure 8D:
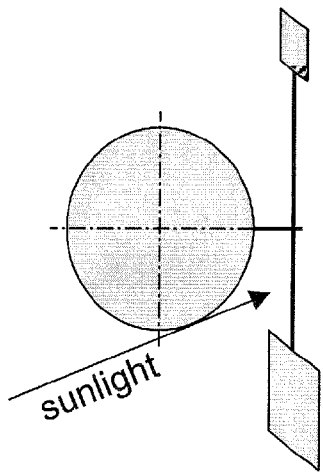
FIGS. 8(A)-8(D), are top and end views, respectively, of the airborne power station of FIG. 4, showing how the array may be oriented perpendicular to sunlight.
Figure 8B:
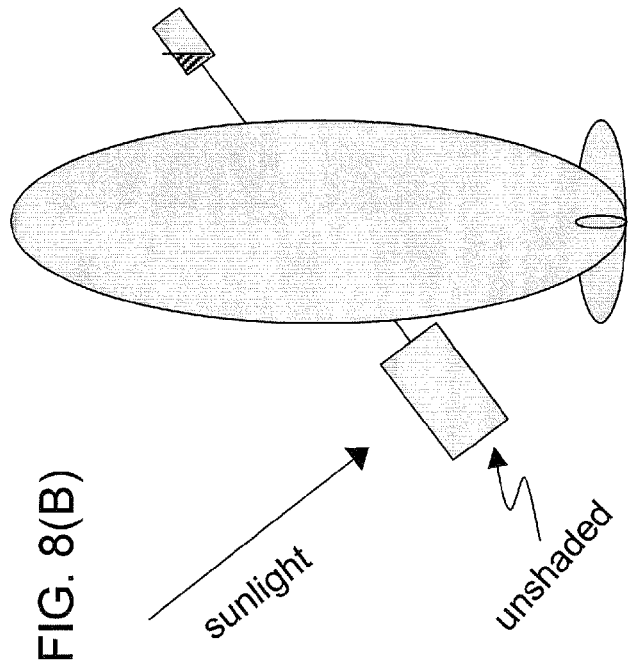
Figure 8C:
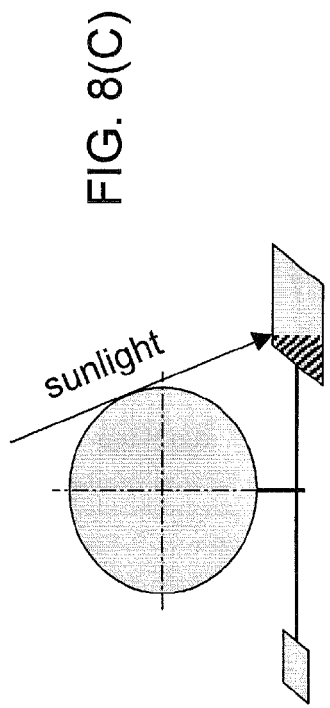
Figure 8A:
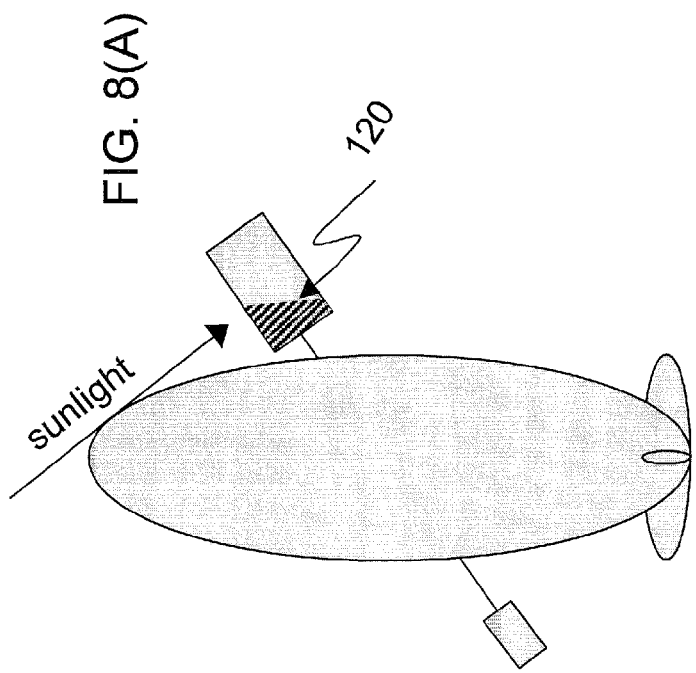

In a particular embodiment, the counterbalance 830 (like the solar power generation system 810) is substantially planar and can be made to pivot about the beam's 800 horizontal axis to present a variable cross section to the wind (thereby balancing the solar power generation system's 810 drag) and a variable angle of attack (thereby balancing the solar power generation system's 810 lift—which may be upward or downward). FIG. 7 illustrates this pivoting (dashed line) with corresponding lift and drag vectors.

Referred to FIGS. 8(A)-8(D) another aspect of the present disclosure provides a method of accommodating the heading of the airborne platform 50 relative to the direction of the sun. The optimal orientation of the beam 800 has the solar power generation system 810 substantially perpendicular to the sun vector and not shaded by the airborne platform 50. Because the solar power generation system 810 can pivot to face either side of the beam 800, there are two positions in which the solar power generation system 810 will be perpendicular to the sun vector. If the sun is ahead of or behind the airborne platform 50, then either position is unshaded. More commonly, however, the sun will be at some moderate elevation angle on the left or right side of the airborne platform 50, so the right or left side (respectively) will be shaded. In this case, the operator or a program selects the position wherein the solar power generation system 810 is on the unshaded side.

Figure 5:
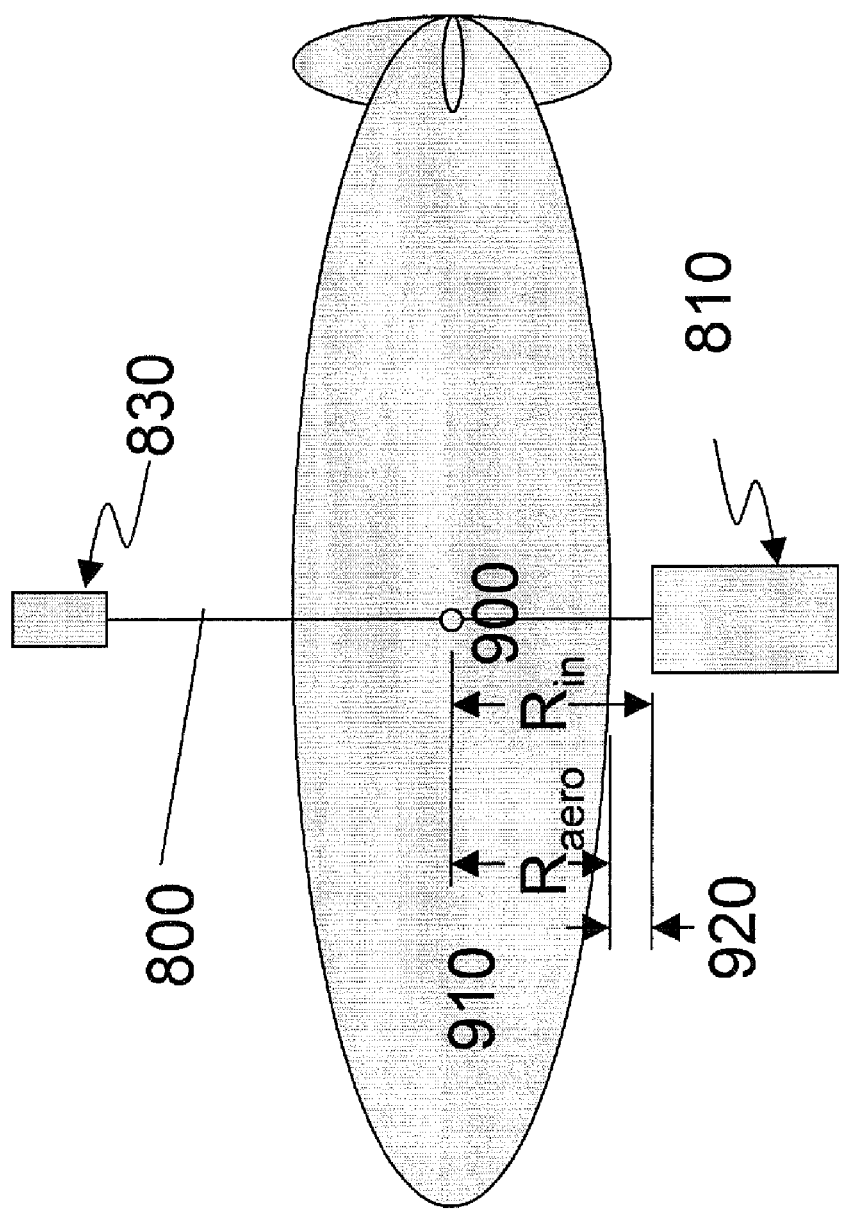
FIG. 5 is a bottom view of the airborne power station according to FIG. 4.

In a further embodiment, the counterbalance 830 is configured to provide aerodynamic drag that substantially counters torque from aerodynamic drag of the solar power generation system 810. Alternatively, the counterbalance 830 may be configured to provide aerodynamic lift that substantially counters torque from aerodynamic lift of the solar power generation system 810. Since the drag and lift produced by the solar power generation system 810 vary with the solar power generation system's 810 orientation, another embodiment includes a counterbalance 830 whose aerodynamic configuration can be changed to counter a range of torques produced by the solar power generation system 810. One such embodiment includes a horizontal axle 800 to which both the solar power generation system 810 and a flat counterbalance 830 are attached, with the solar power generation system 810 and the counterbalance 830 mounted with their flat sides parallel as in FIG. 5. In this embodiment, rotating either axle to change the orientation of the solar power generation system 810 automatically changes the orientation of the counterbalance 830 in the same way. Thus, the area ratio given by:

$$\frac{\text{(counterbalance's frontal area facing the wind)}}{\text{(solar power generation system's frontal area facing the wind)}}$$

remains constant. Since drag is proportional to frontal area, to first order, the drag torque produced by the counterbalance 830 will cancel the drag torque produced by the solar power generation system 810. In addition, the counterbalance's 830 angle of attack is essentially identical to the solar power generation system's 810 angle of attack, so to first order, the counterbalance's 830 lift will be proportional to the solar power generation system's 810 lift. Therefore, the torque produced by the solar power generation system's 810 lift will be cancelled.

In one embodiment, rotation about the vertical and horizontal axes is controlled directly by actuators, e.g. electric motors or hydraulic systems. In another embodiment, rotation about one or both axes is controlled or assisted by aerodynamic control surfaces or trim tabs attached to the counterbalance and/or the solar power generation system 810. Using aerodynamic control surfaces to produce torque allows use of lighter, less costly actuators for the vertical and/or horizontal axles.

Figure 9:
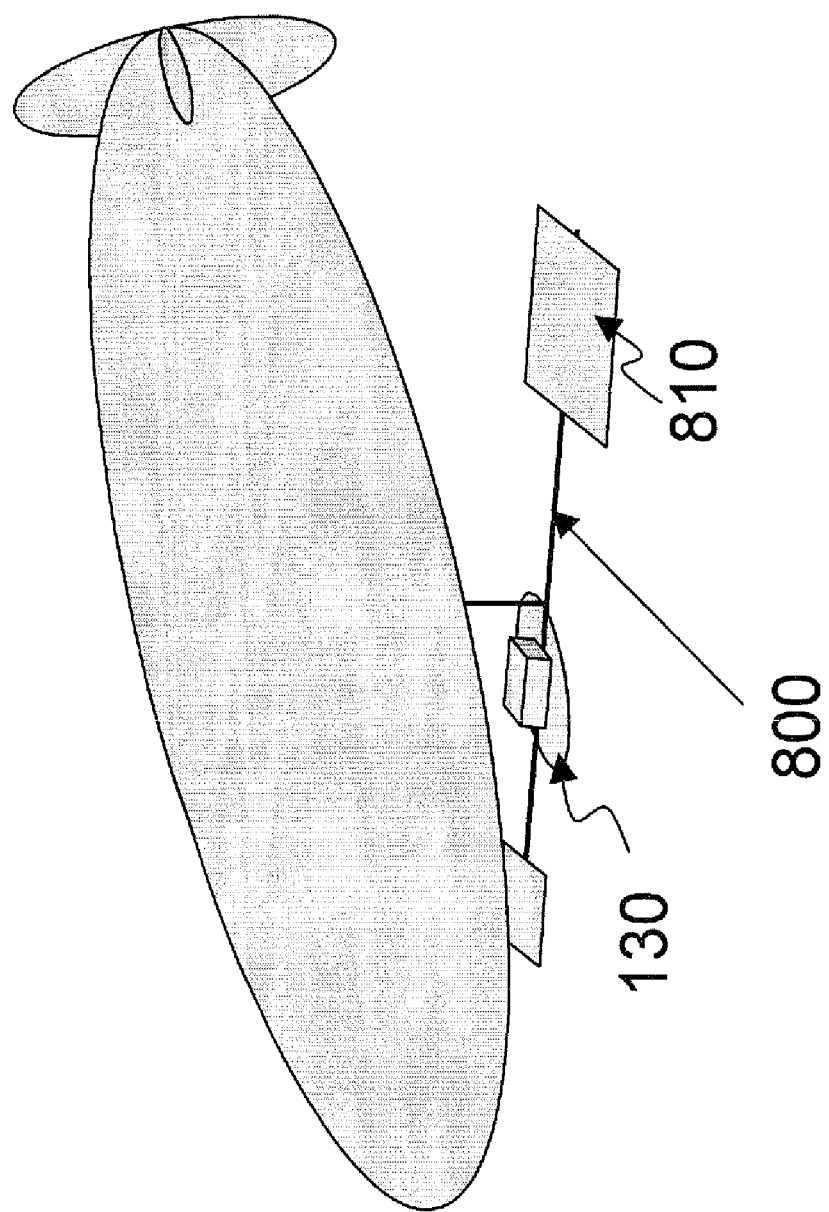
FIG. 9 is a view, similar to FIG. 4, of an alternative embodiment of the disclosure.

FIG. 9 shows another embodiment of the disclosure in which a Microwave Power Transmitter (MPT) 130 is mounted, for example, on the beam 800 near the vertical axis 820 in a configuration that allows it to be pointed at a receiver on the Earth's surface, despite motions of the beam 800. FIG. 9 shows an example where the MPT 130 includes a nadir-pointing phased array antenna. Mounting the MPT 130 on the beam 800 near the PV array 810 reduces the length of high-power cable runs from solar power generation system 810 to MPT 130, thereby reducing weight compared to a configuration with the MPT 130 attached to the airborne platform 50. Mounting the MPT 130 on the horizontal beam 800 also avoids the need for additional sliprings or flex points in the high-power cables. Preferably, the MPT 130 is configured to provide part of the counterbalance and counter drag forces to counteract torque from the solar power generation system 810.

Figure 10F:
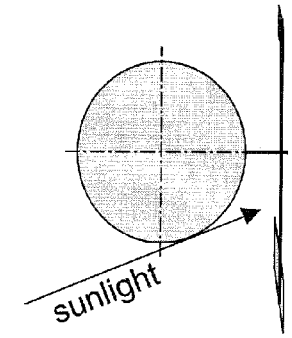
FIGS. 10(A)-10(C) are transparent top and FIGS. 10(D)-10(F) end views illustrating orientation of an array of the airborne power stations of FIG. 4 with respect to sunlight.
Figure 10C:
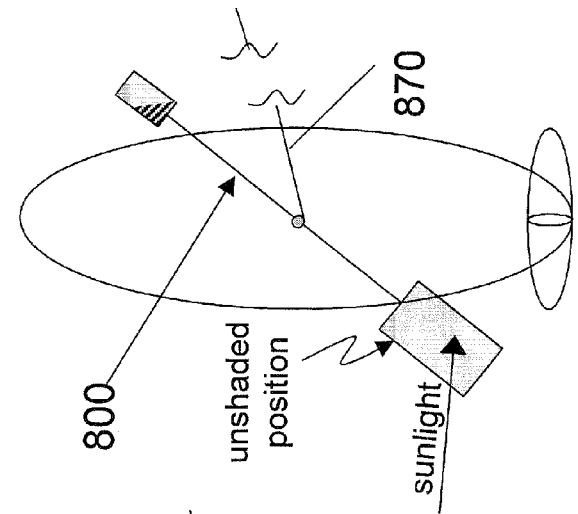
Figure 10E:
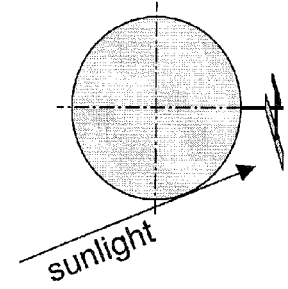
Figure 10B:
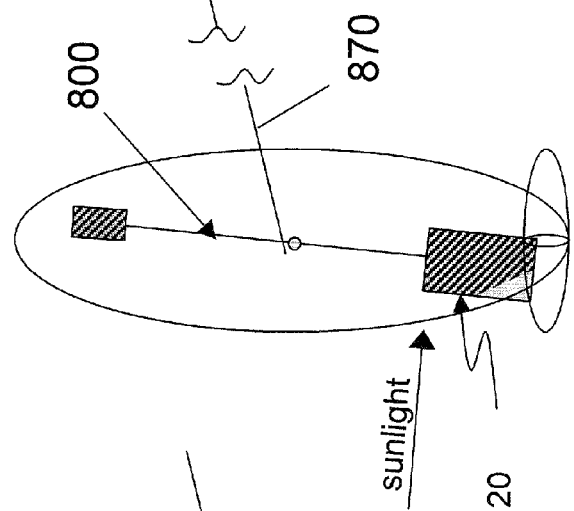
Figure 10D:
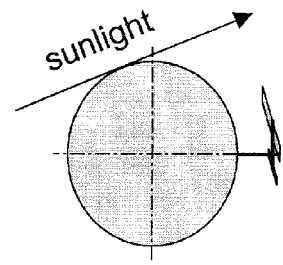
Figure 10A:
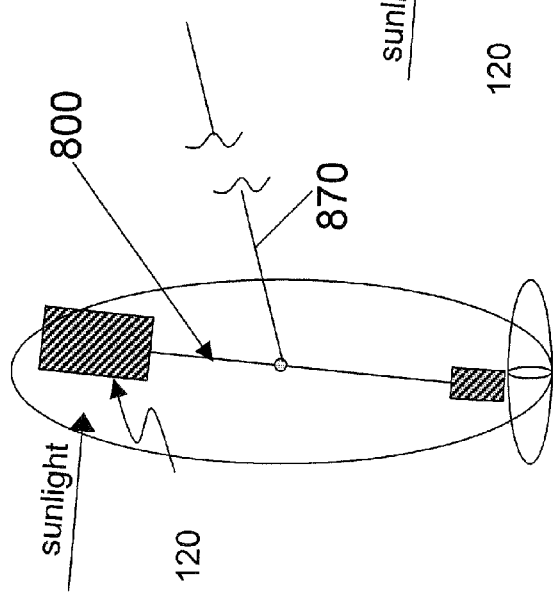

Referring to FIGS. 10(A) and (D) and FIGS. 10(B) and (E), respectively, the sun is near zenith and nearly side-on to the airborne platform 50, there may be cases where both of the "perpendicular to sun" positions are shaded by the front or aft ends of the airborne platform 50. Several embodiments minimize these cases or provide relief from them. Making the inner radius of the solar power generation system (the distance from vertical axle 820 to inner edge of solar power generation system 810) substantially larger than the waist radius of the airborne platform 50 minimizes the cases. Enlarging the vertical separation of the beam 800 from the airborne platform 50 minimizes these cases. In embodiments where the airborne platform 50 is steerable, an operating method includes changing the airborne platform's 50 heading so it does not face directly into the wind, but exposes more of the solar power generation system 810 to sunlight. However, there is very little cosine loss if the solar power generation system 810 is positioned sticking out to the sunlit side as shown in FIGS. 10(C) and 10(F) when the sun is near zenith. Therefore, the present disclosure includes an operating method wherein the solar power generation system 810 is usually oriented to minimize cosine losses, but wherein some cosine losses are tolerated when necessary to position the solar power generation system 810 to avoid shading.

Some APS embodiments use a tether or cable 870 to keep the airborne platform 50 from drifting on the wind and/or an electrical cable to transmit power to the ground. Typically, the tether and/or cable, which could include rigid and slack or extensible devices, is attached at roughly the location where the vertical axle 820 should be attached. The disclosure therefore includes an embodiment wherein the tether 870 provides the structural function of vertical axle 820, with the horizontal beam 800 attached to the tether 870 and configured to pivot about it with the rotation controlled by aerodynamic control surfaces. The distance between the horizontal beam 800 and the airborne platform 50 is large enough that the beam cannot strike the airborne platform even when the tether is angled substantially away from vertical, as in a strong wind.

Figure 11:
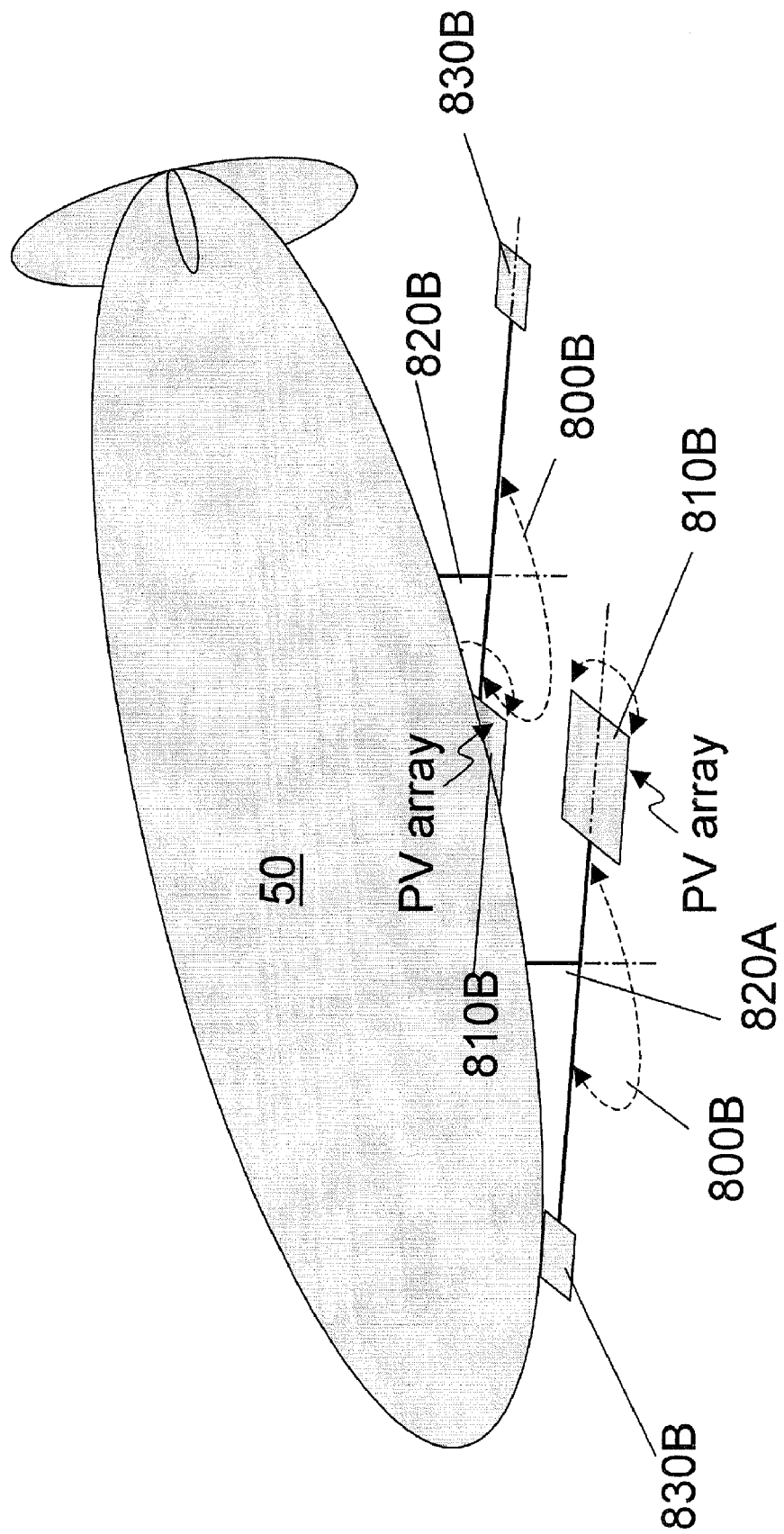
FIG. 11 is a view similar to FIG. 4 showing an alternative embodiment of the disclosure.
Figure 12:
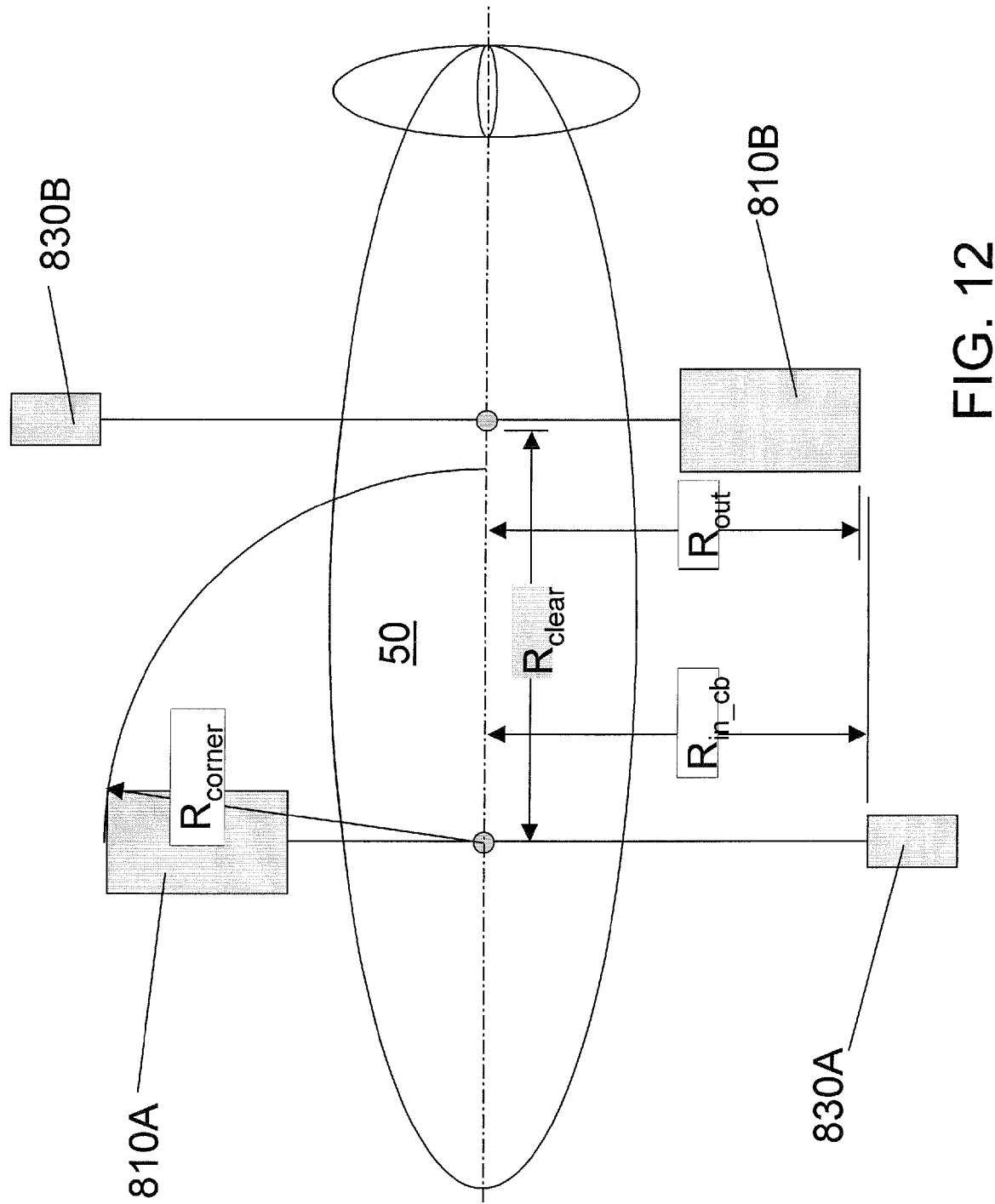
FIG. 12 is a bottom view of the airborne power station of FIG. 11.
Figure 13:
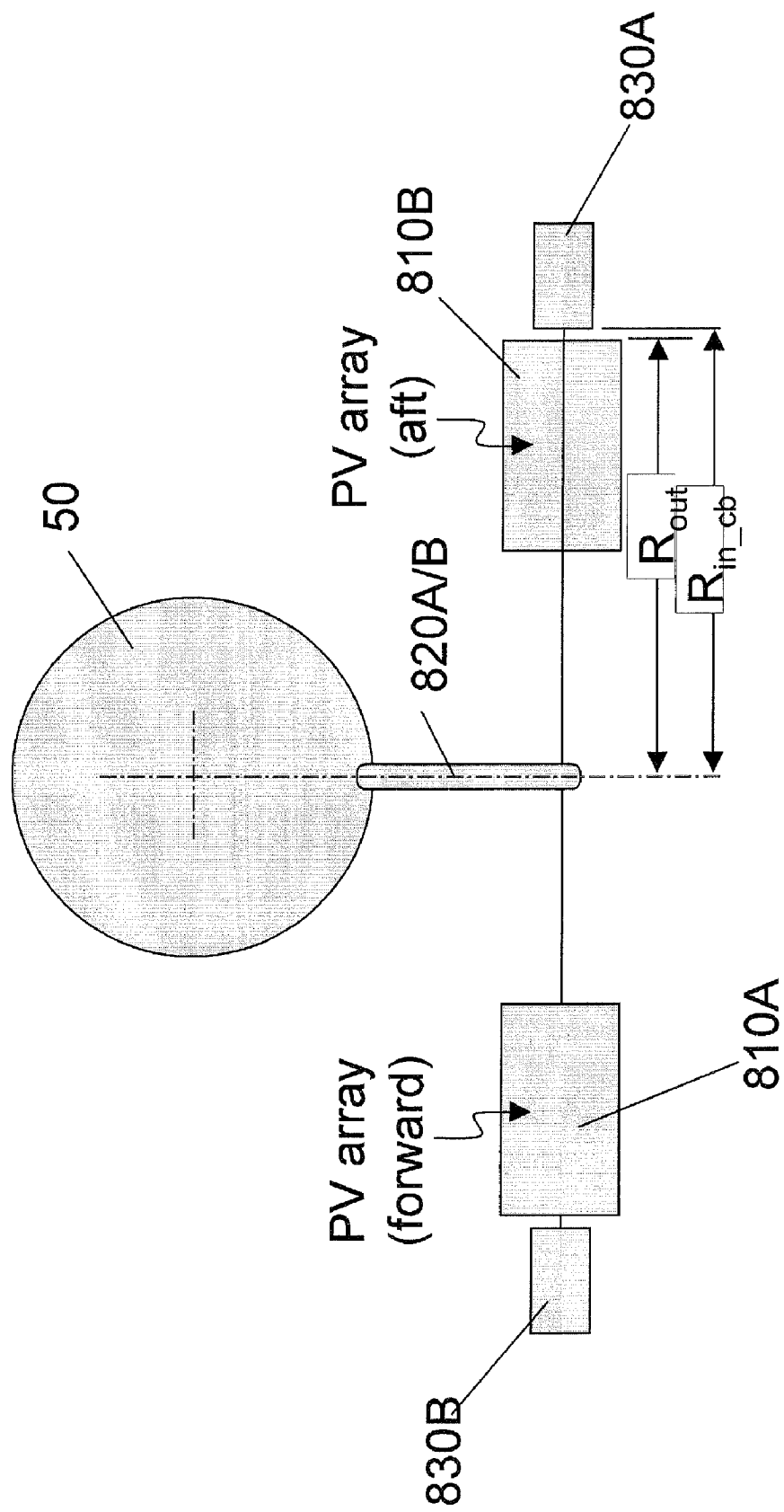
FIG. 13 is an end view of the airborne power station according to FIG. 11.

The foregoing examples show an APS applied to a single vertical axle or pivot and a single horizontal beam. FIGS. 11-15 show alternative embodiments in which two PV arrays are supported. In FIGS. 11-13, two PV arrays 810A and 810B are supported from two vertical axes 820A and 820B, respectively vertical axes 820A and 820B support horizontal axes 800A and 800B which in turn support the PV arrays 810A and 810B and counterbalances 830A and 830B, respectively. Both horizontal beams 800A and 800B must be able to pivot about the vertical axle through much more than 180 degrees, though they do not need to pivot through 360 degrees. Thus, the distance $R_{corner}$ must be less than $R_{clear}$ so each PV array 810A/810B has clearance to pivot past the other axle 820A/820B. In addition, each PV array 810A/810B must be able to get a mostly unshaded view of the sun when the sun is at a low elevation directly in front of the aerostat or behind it. This condition is met if the distance $R_{out}$ from the axle to the outer edge of the PV array is less than $R_{in\_cb}$, the radius to the inner edge of the counterbalance. As seen from the sun's position when the sun is directly in front of the aerostat (FIG. 12), this allows the aft PV array to see the sun, shaded only by the relatively thin horizontal beam of the forward array. If the sun were slightly to the aerostat's right of dead center (viewer's left), the operator would use this orientation of the arrays. If the sun were slightly to the aerostat's left of dead center (viewer's right), this orientation would cause the forward counterbalance to shade the aft PV array. Therefore, when the sun is slightly to the aerostat's left, the operator would rotate the axles so that the forward PV array was on the left and the aft PV array was on the right. Other reorientations allow both arrays to remain substantially unshaded as the sun traverses the sky. In some sun positions, the arrays may be oriented so that both are on the same side of the aerostat. In some sun positions, one or both arrays may be slightly off-perpendicular to the sun.

Figure 14:
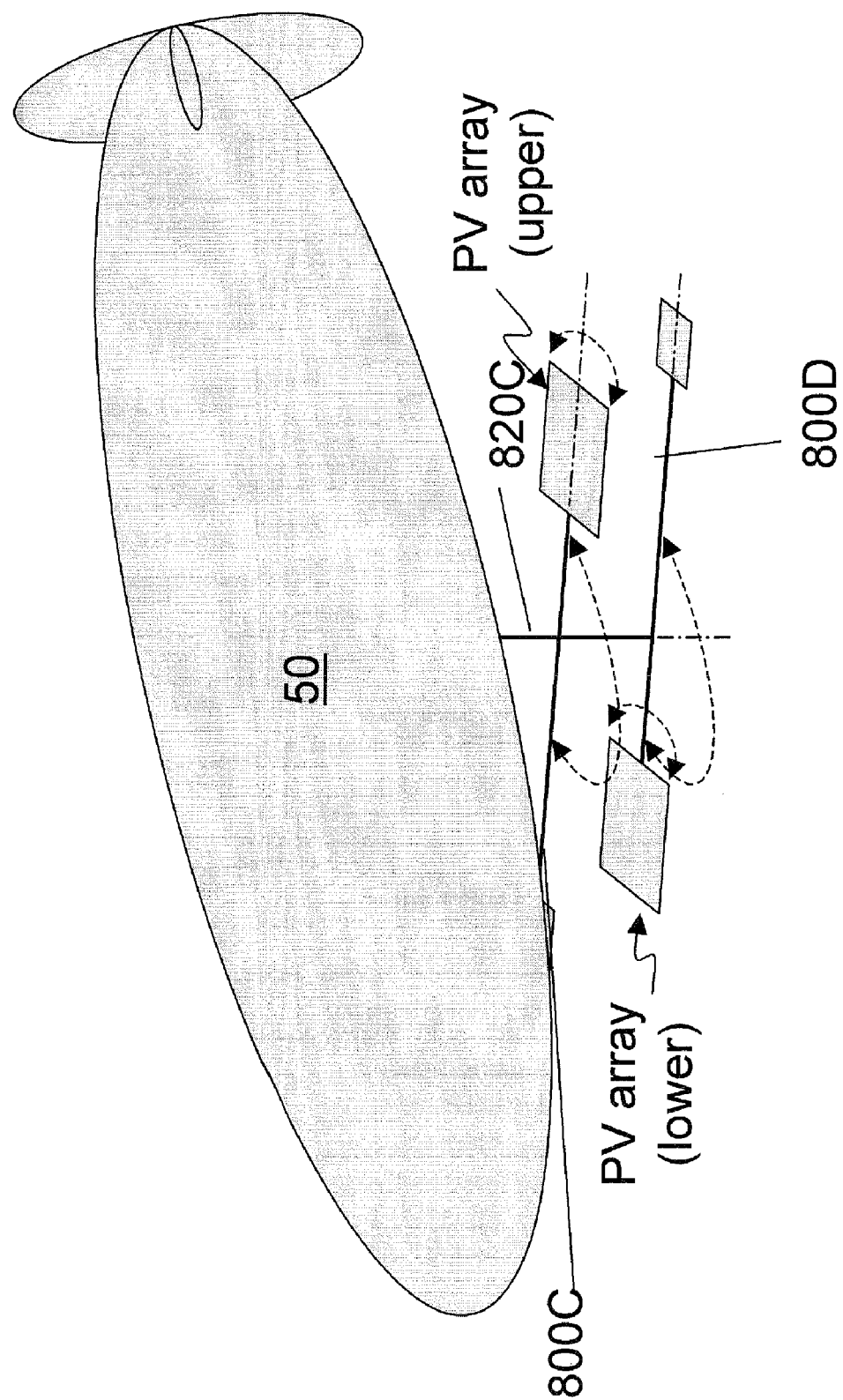
FIG. 14 is a view similar to FIG. 4 of yet another embodiment of airborne power station in accordance with the present disclosure.
Figure 15:
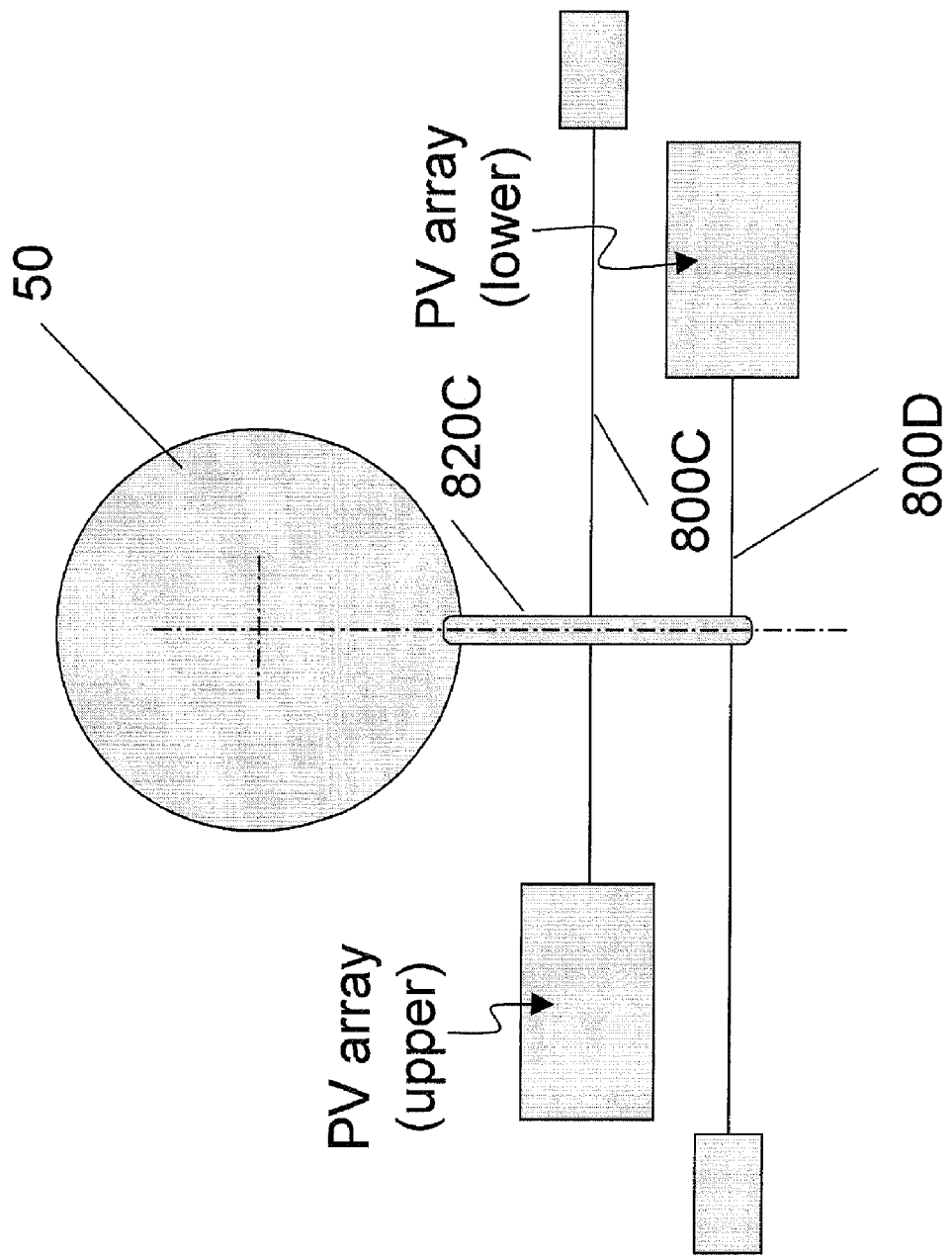
FIG. 15 is an end view of the airborne power station of FIG. 14.

Referring now to FIGS. 14 and 15, in an alternative embodiment, two or more horizontal beams 800C and 800D may be attached to a single vertical axle 820C. As with the prior embodiment, the outer radius of the PV arrays' motion must be less than the inner radius of the counterbalances' motion (FIG. 15). This allows each PV array to be unshaded by the other beam's counterbalance even when the sun is directly overhead. Various reorientations allow both arrays to remain substantially unshaded as the sun traverses the sky.

Which embodiment to use will vary depending on the planned location and application. Likewise, the decision of what parameter values to assign for each system element—such as size of airborne and terrestrial microwave antennas, microwave frequency, particular solar power generation system technology, and peak capacity of the solar power generation system—also will depend on details of the application for each instance.

Another aspect of the present disclosure provides a method for providing electric power having a low environmental impact, comprising the steps of: providing an airship including a solar power generation system and a microwave transmission system; releasing the airship from its mooring; controlling the flight of the airship to reach and maintain a desired location; orienting the solar power generation system 810 to maximize power output; aiming the microwave power transmission system 130 at a microwave power receiver and transmitting that power to the microwave power receiver. The power output is then converted for use in local infrastructure or by a remote consumer. The method further includes retrieving and landing the airship as needed for maintenance or upgrades.

Figure 1:
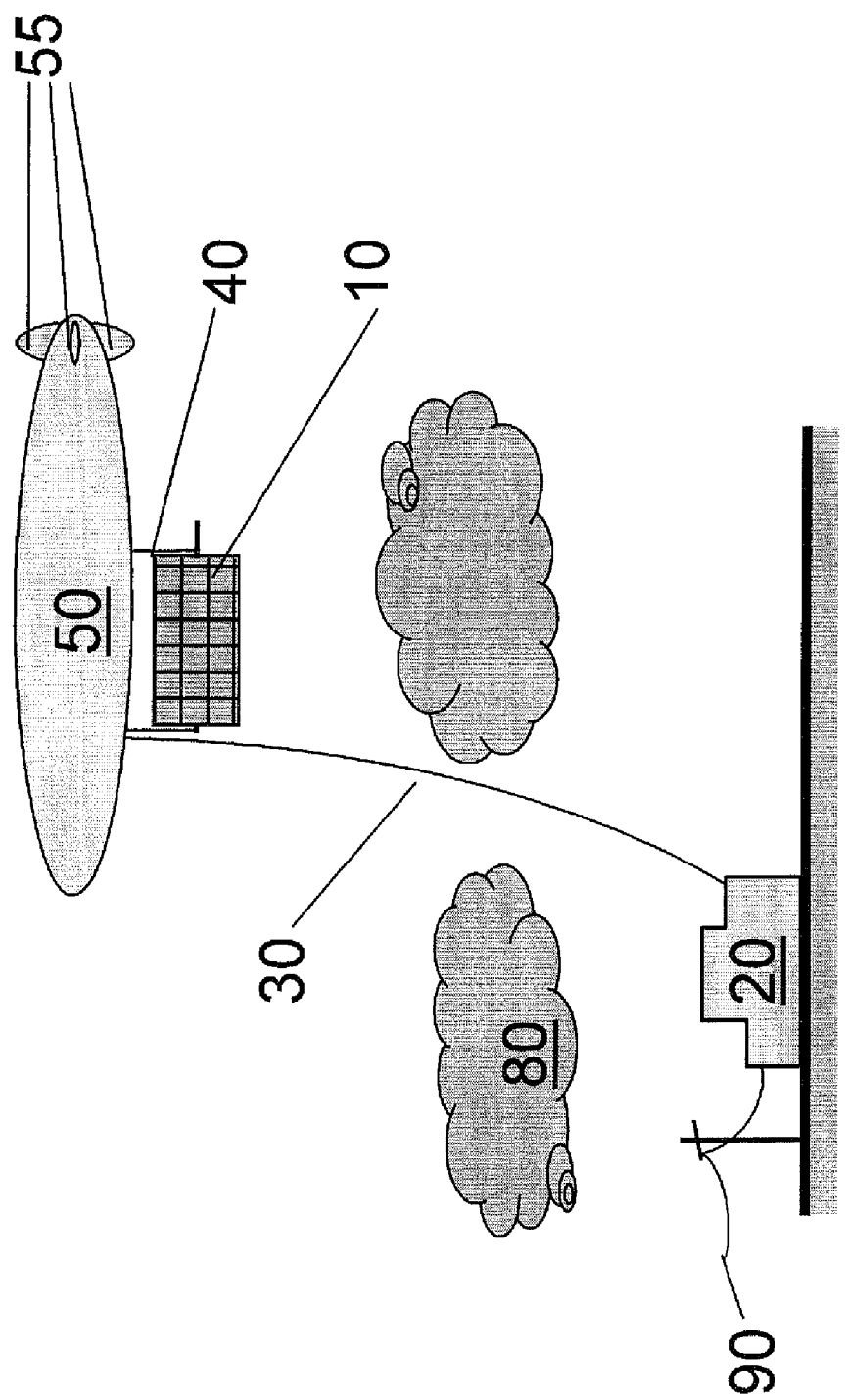
FIG. 1 is an illustration of an airborne solar power station in accordance with an exemplary embodiment of my parent U.S. application Ser. No. 12/049,234.
Figure 2:
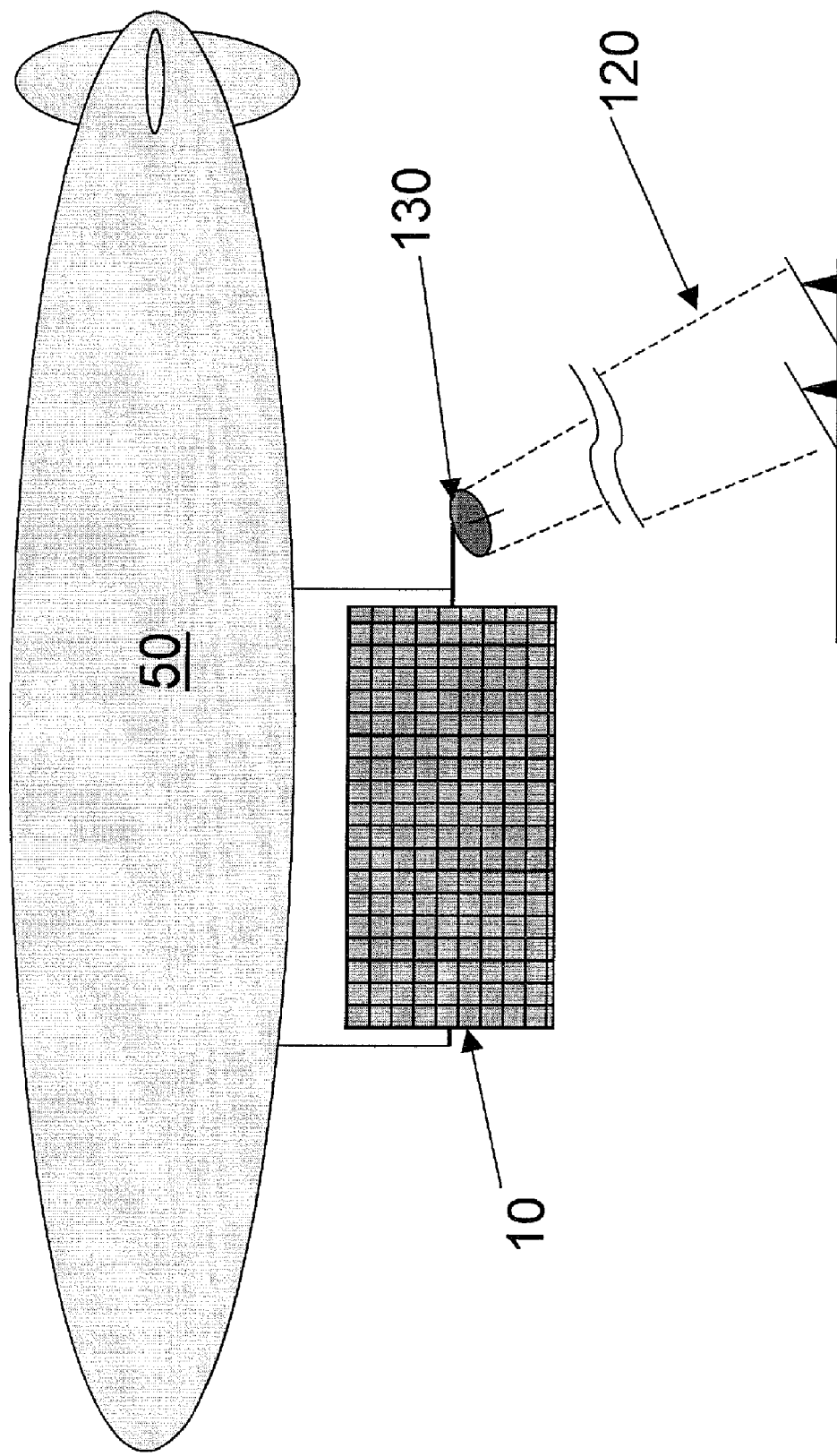
FIG. 2 is a view similar to FIG. 1 of an airborne solar power station in accordance with an exemplary embodiment of an exemplary of U.S. application Ser. No. 12/128,561.
Figure 3C:
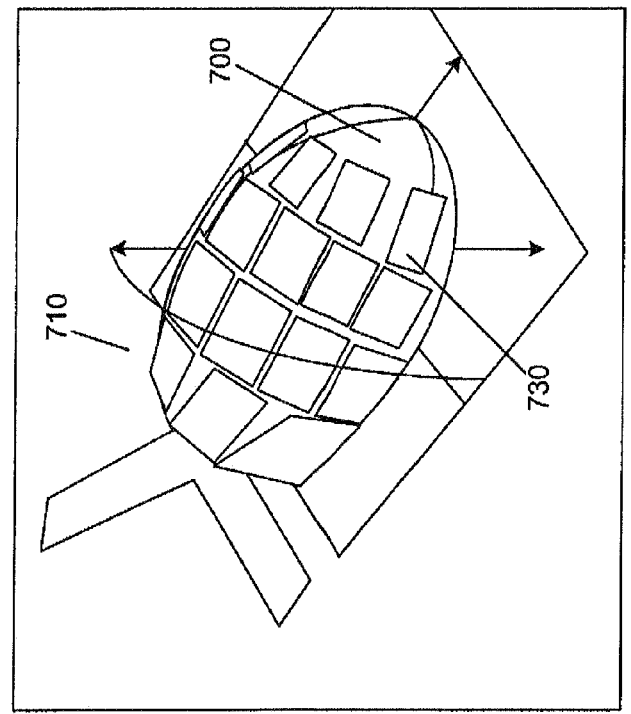
FIGS. 3(A), 3(B) and 3(C) are representations of PV arrays located below an airborne power station, beside an airborne power station or conforming to the outer surface of an airborne power station, respectively.
Figure 3A:
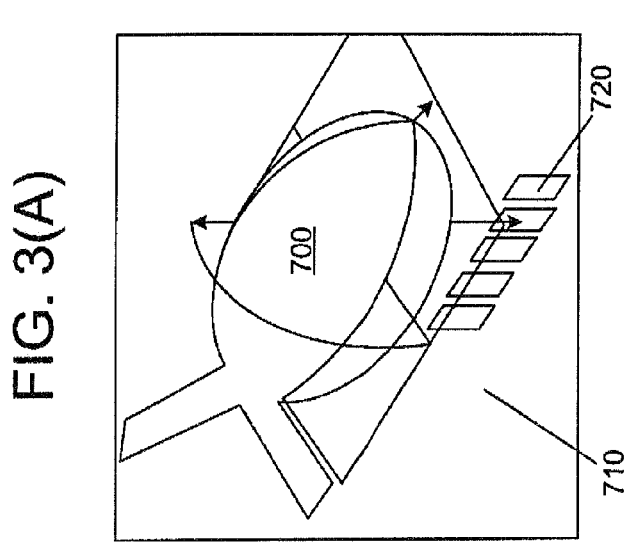
Figure 3B:
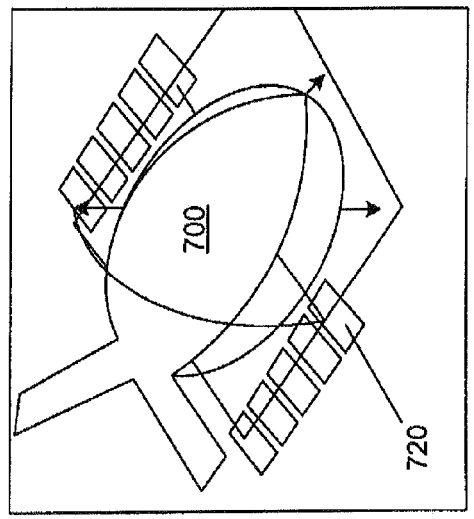
Figure 4:
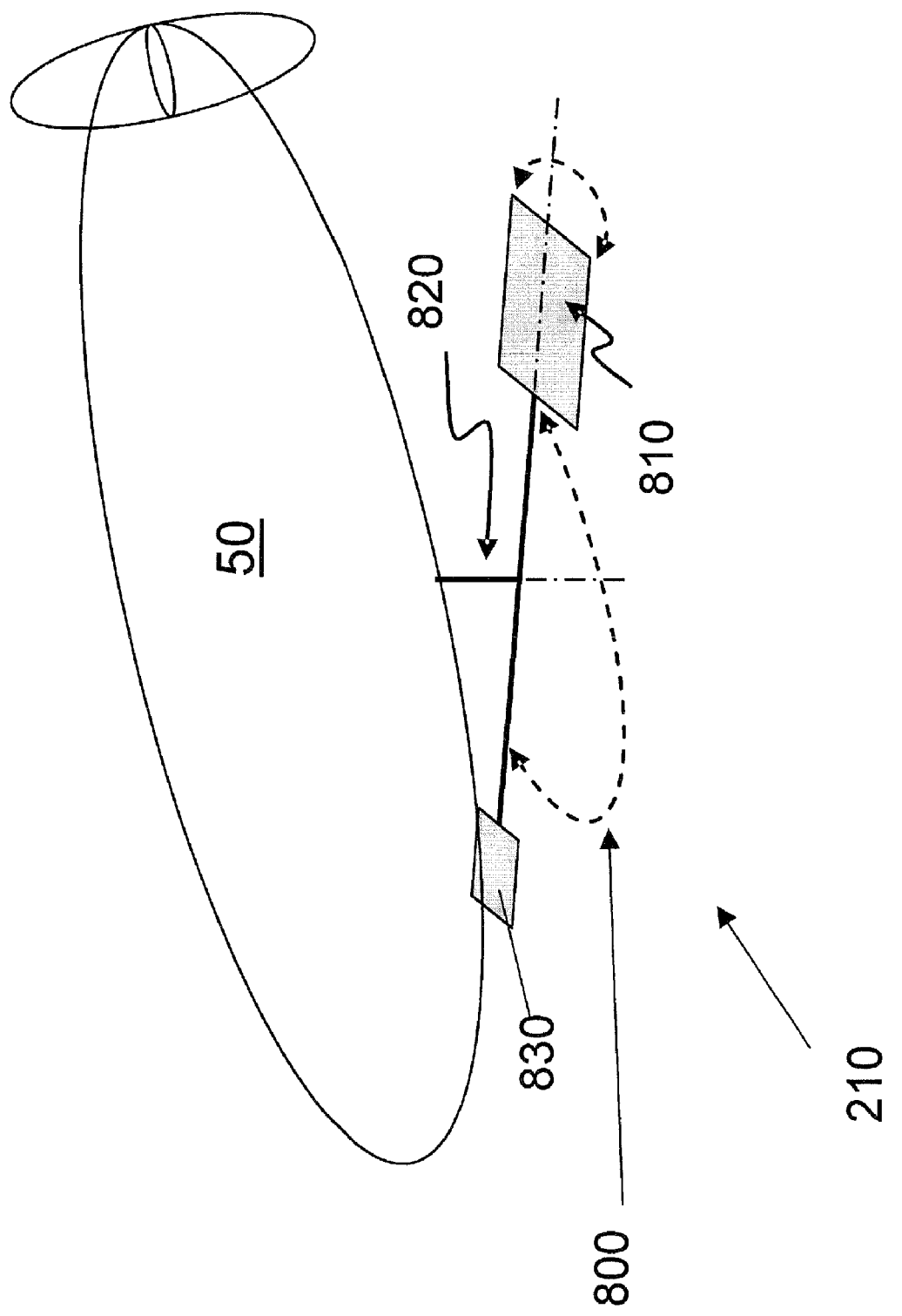
FIG. 4 is a perspective view of an airborne power station according to one embodiment of the present disclosure.

This method may be adapted to any of the embodiments described above. For instance, the aerostat may be controlled from a control station located at the Earth's surface. Once reaching an operating altitude, the solar power generation system 810, e.g., a PV cell array, may be oriented by steering the airship itself or by manipulating steering elements which control the azimuth and or elevation angle of the solar power generation system. An operator, who may be located at a control station, or may be accomplished automatically, may perform this orientation The embodiments described above enable a solar power generation system 810 on an airborne platform 50 to have an essentially unshaded view of the sun throughout the day with little or no cosine loss. Relative to the Airborne Power System configuration in FIG. 3, an unshaded PV array 810 with 2-axis tracking provides a substantial improvement in the average daily output per square meter of solar power generation system 810. This is summarized in the table below.

| condition | Embodiment | Conformal | 1 axis horiz. | 1 axis vert. |
|---|---|---|---|---|
| 45° lat. winter | 0.69 | 0.25 | 0.21 | 0.66 |
| 25° lat. summer | 2.45 | 1.15 | 2.45 | 0.46 |

The table tabulates kW-hr/m$^2$ per day from a simulated APS in two very different situations: one at 45 degree N latitude at winter solstice and one at 25 degree N latitude at summer solstice. Both simulations assumed that (a) the APS is at 5 km altitude with the airborne platform facing due east and (b) the solar arrays are 25% efficient.

Figure 16:
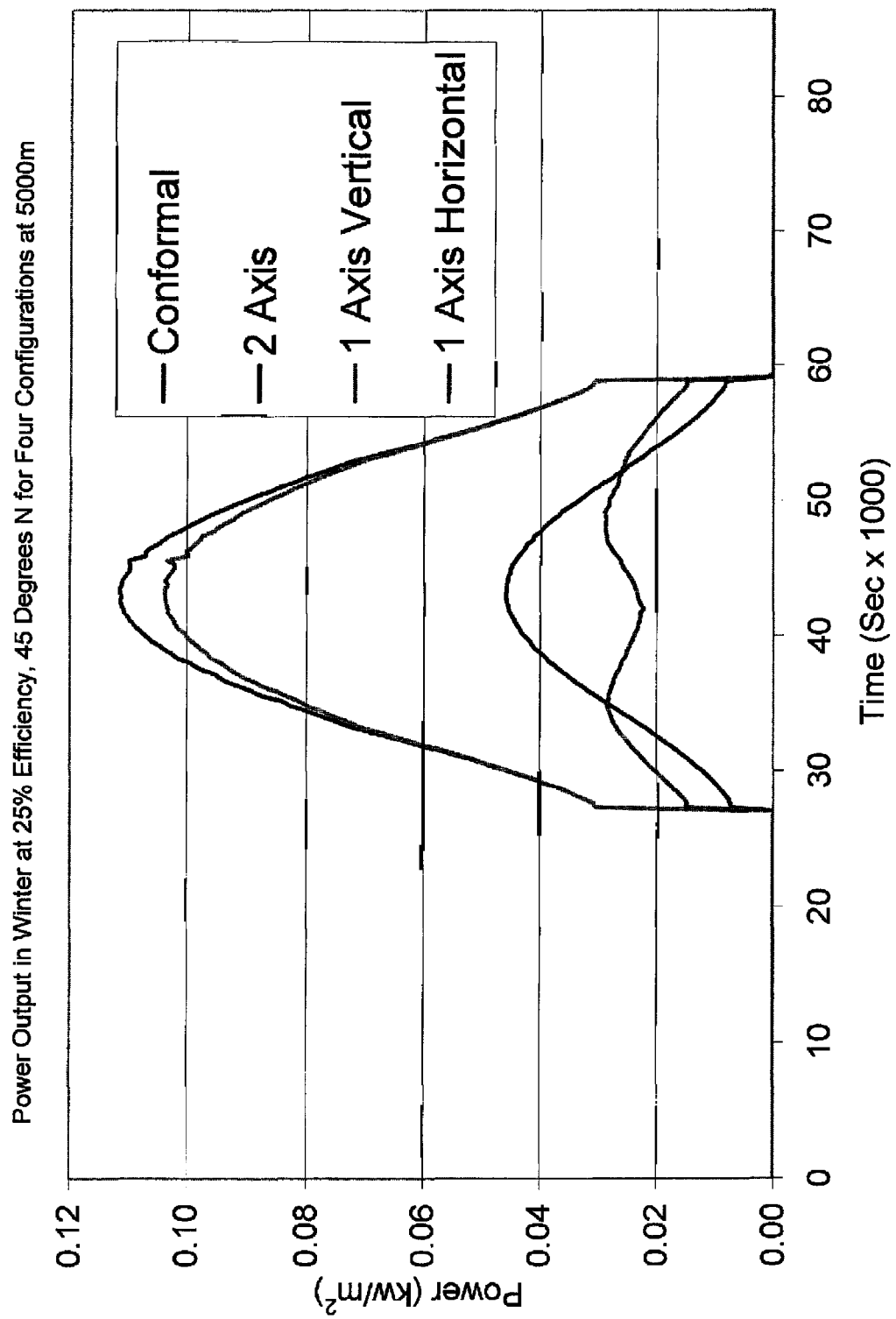
FIG. 16 is a representation of power from various APS configurations in winter.

Performance throughout the day for the winter case is plotted in FIG. 16. Power jumps up from zero at local sunrise (about 27,000 seconds after midnight) and drops to zero at local sunset (about 59,000 seconds after midnight). In this example, the sun never rises more than 23 degrees above the horizon, so sunlight reaching the APS is relatively weak because of its long path through the atmosphere. The conformal PV configuration and the horizontally rotating array configuration both suffer from large cosine losses and from aeroshell shading of PV cells on the north side of the airborne platform. The vertically rotating array configuration, however, incurs only modest cosine losses in mid-day. The invention (curve labeled "2 Axis") incurs even less loss.

Figure 17:
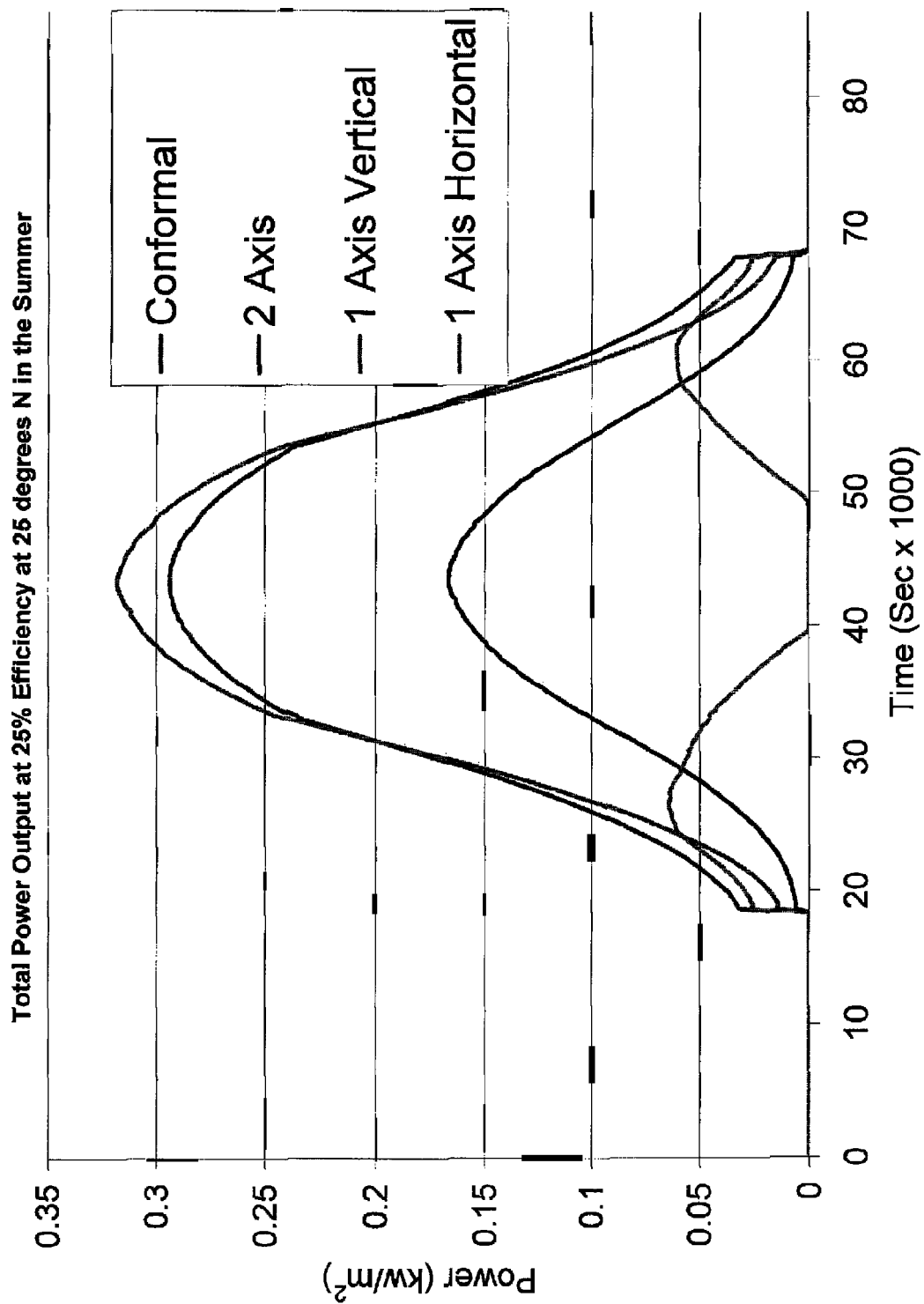
FIG. 17 is a representation of power from various APS configurations in summer.

Performance for the summer case is plotted in FIG. 17. In this example, the sun nearly reaches the zenith at noon, so sunlight reaching the APS is not attenuated much—hence the maximum power is greater than for the winter case. The conformal PV configuration and the horizontally rotating array configuration experience little shading by the aeroshell, but the conformal configuration suffers from large cosine losses. The horizontally rotating arrays shade each other in the morning and evening when the sun is ahead of the airborne platform and behind it, respectively. The vertically rotating array is completely shaded by the aeroshell during the middle part of the day. The configuration of the present disclosure (curve labeled "2 Axis") does better than all other configurations during morning and evening because it is essentially perpendicular to the sunlight and not shaded. This simulation did not include the control illustrated by FIG. 10(C) so it keeps the PV array perpendicular to the sun even when it is shaded by the aeroshell. Therefore, the "2 Axis" curve suffers from some aeroshell shading during mid-day. A more complete simulation would include a rule to accept some cosine losses to keep the PV array in sunlight.

The simulation is based on Pro/ENGINEER 3D modeling of an APS using Pro/ENGINEER 3D modeling software available from Parametric Technology Corporation, Needham, Mass., with various PV array configurations. Satellite ToolKit (STK) (Analytical Graphics, Inc. Exton, Pa.) runs (1) located and oriented the airborne platform, (2) modeled the sun's progression across the sky at 300 second intervals, (3) simulated rotation of each PV array in accordance with selected constraints and sun-tracking algorithms, and (4) calculated what fraction of each PV array was shaded by the aeroshell or by other arrays during each interval. A separate code modeled the transmission of sunlight through the atmosphere at each interval and applied that solar intensity to the sunlit area of each array. Excel spreadsheets normalized the power output to compute power per square meter of PV array, plotted the results, and summed the power for all intervals to produce daily energy totals.

The Pro/ENGINEER models were based on a 38 meter airborne platform currently manufactured by TCOM, L. P., Columbia, Md., a major airborne platform vendor. PV arrays were modeled as 4 meter×7 meter flat panels. Solar-to-electric conversion efficiency was assumed to be 25%.

It should be emphasized that the above-described embodiments of the present disclosure, particularly, any "preferred" embodiments, are merely possible examples of implementations, merely set forth for a clear understanding of the principles of the airborne power station. Many variations and modifications may be made to the above-described embodiments without departing substantially from the spirit and principles of the disclosure. For instance, the airborne platform may be provided with a transponder or beacon to facilitate air traffic control to avoid potential problems. Also, the tether or power cables, if used, may further include lights. All such modifications and variations are intended to be included herein within the scope of this disclosure and protected by the following claims.

What is claimed is:

1. A system for converting sunlight to electricity comprising:
a—lighter than air—platform deploying the system;
a solar power generation system coupled to the airborne platform by a support; and
a control system coupled to the support to manipulate the support such that the solar power generation system may be moved away from a shadow that might be cast by the airborne platform
wherein the support comprises a vertical axle coupled to the airborne platform, and a beam or truss that is capable of rotating in a horizontal plane coupled to the vertical axle; and
wherein the solar power generation system is supported adjacent only one end of the beam or truss.

2. The system of claim 1, further comprising a horizontal axle coupled to the beam or truss, wherein said solar power generation system is coupled to the axle such that the solar power generation system may be pivoted about both the horizontal and vertical axles.

3. The system of claim 1, wherein the beam or truss and the vertical axle are comprised of a single moveable system.

4. The system of claim 1, further comprising a counterbalance coupled to the beam or truss at an end opposite the solar power generation system.

5. The system of claim 4, wherein the counterbalance also provides aerodynamic lift to substantially counter torque produced by aerodynamic lift of the solar power generation system.

6. The system of claim 4, wherein the counterbalance has a flat side, and the solar power generation system has a sun-facing side, and the counterbalance is mounted such that the flat side is substantially parallel to the sun-facing side of the solar power generation system.

7. The system of claim 1, further comprising a converter for converting power from the solar energy power generation to microwave energy, and a microwave power transmitter for transmitting microwave energy to a remote collector, supported by the beam or truss.

8. The system of claim 1, wherein the support is a tether for maintaining the solar power generation system in a desired location above the Earth.

9. The system of claim 1, wherein the solar power generation system includes a plurality of steerable solar energy collection panels.

10. The system of claim 1, wherein the control system comprises actuators coupled to a command system to manipulate the support.

11. The system of claim 1, comprising two or more solar energy power generation systems coupled to the airborne platform.

12. The system of claim 11, wherein the two or more solar energy power generation systems are supported on a common axle.

13. The systems of claim 11, wherein the two or more solar energy power generation systems are supported on separate axles.

14. A method of increasing efficiency of a solar power generation system on a lighter than air airborne platform, comprising the acts of:
provinding the solar power generation system supported at only one end of a beam or truss coupled to the airborne platform and capable of rotating in a horizontal plane;
monitoring position and angle of absorption with regard to sunlight of the solar power generation system;
engaging a control system to keep the solar power generation system out of the shadow of the airborne platform; and
engaging the control system to orient the solar power generation system such that solar power generation system is substantially perpendicular to sunlight.

15. The method of claim 14, including the step of providing a counterbalance for the solar power generation system.

16. The method of claim 15, including the step of adjusting the counterbalance to counter an aerodynamic lift produced by the solar power generation system.

17. The method of claim 15, including the step of adjusting the counterbalance to counter a torque produced by the solar power generation system.

* * * * *